(12) United States Patent
Pankey et al.

(10) Patent No.: US 7,707,051 B2
(45) Date of Patent: Apr. 27, 2010

(54) VIDEO GAME FOR PREDICTIVE MODELING OF PREMIUMS FOR INSURANCE

(75) Inventors: David M. Pankey, Lewiston, ID (US); Steven James Gaspar, Ridgefield, WA (US)

(73) Assignee: The Regence Group, Portland, OR (US)

( * ) Notice: Subject to any disclaimer, the term of this patent is extended or adjusted under 35 U.S.C. 154(b) by 1265 days.

(21) Appl. No.: 11/223,506

(22) Filed: Sep. 9, 2005

(65) Prior Publication Data
US 2007/0060227 A1    Mar. 15, 2007

(51) Int. Cl.
G06Q 40/00    (2006.01)
(52) U.S. Cl. ............................ 705/4; 273/292; 273/302; 434/128
(58) Field of Classification Search ......... 273/292–302; 705/4; 434/128
See application file for complete search history.

(56) References Cited

U.S. PATENT DOCUMENTS 5,207,431 A * 5/1993 Joseph ........................ 273/278
6,802,810 B2 10/2004 Ciarniello et al.
2005/0272023 A1 * 12/2005 Takano et al. ............... 434/350

OTHER PUBLICATIONS

Jones et al., "The risks of ignoring insurance risk management", Health Affairs: Chevy Chase: Spring 1994, vol. 13, Iss. 2.*
Pittsburg Post-Gazette, "This 'insane' drug war affects the constitutional rights of all" Pittsburg, Pa, May 27, 2001.*
Reinhardt, "The defined contribution paradox", Health Forum Journal, San Francisco, May/Jun. 2001.*
Bonura, "If health insurance is a maze, HMO vet claims to know way", New Orleans CityBusiness, Metairie, Oct. 1, 2001.*

* cited by examiner

*Primary Examiner*—Olabode Akintola
(74) *Attorney, Agent, or Firm*—Darby & Darby PC; John W. Branch

(57) ABSTRACT

A game that serves to educate a player about the decision making process for determining the cost of a premium for insurance coverage for an entity. The player(s) and/or team(s) select a fictitious name for an insurance company. The company can subsequently bid on providing insurance coverage for an entity. Several rounds of bidding on insurance premiums for providing insurance coverage to an entity can be played before determining a winner of the game. A round consists of a player(s) and/or team(s) bidding on the amount to charge for an insurance premium to insure the entity for a particular period of time, such as one year. The winner of a round is the insurance company (player/team) that provides the lowest bid for the insurance premium for the particular period of time.

20 Claims, 8 Drawing Sheets

| COMPANY | INITIAL RESERVE | CHANGE IN RESERVE | ENROLLMENT GAIN | ACCUMULATED RESERVE |
|---|---|---|---|---|
| COMPANY 1 | $250,000 | $XXX,XXX | 0 | $250,000 + XXX,XXX |
| COMPANY N | $250,000 | $YYY,YYY | 0 | $250,000 + YYY,YYY |

START OVER | INSTRUCTIONS | COMPANY NAMES

NEXT BID => | GO

FIGURE 7

VIDEO GAME FOR PREDICTIVE MODELING OF PREMIUMS FOR INSURANCE

FIELD OF THE INVENTION

The present invention relates generally to video games, and more particularly, to teaching predictive modeling of premiums for insurance.

BACKGROUND OF THE INVENTION

Computer video games are a popular form of entertainment finding widespread use in a variety of forms, including: standalone game systems, game cartridge systems connected to television sets, and game software for personal computers.

Many video game systems, today, are played across multiple computers, which are connected together by a network. These systems allow multiple players sitting at individual computers, often remote from each other, to participate in, the same game. Players are able to compete against each other as well as simulated opponents that may be managed by a game server, thereby adding a new dimension to the competition. These systems, and others, may also allow many players to participate in separate video games competing against a simulated opponent managed by the game server, rather than another remote player.

For their part, many of today's video games are written in a wide variety of methods, such as object-oriented programming languages, scripts and interpreted programming languages. The data for playing video games are often stored in tables, databases, spreadsheets, and the like.

Although video games have been popular as a form of entertainment for some time, they have also found acceptance for educational purposes in various industries/businesses. For example, an educational video game might be employed to communicate relatively complex business concepts in an engaging and user friendly manner to employees with diverse backgrounds. It is thus with respect to these considerations, and others, that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein:

FIG. 7 shows an exemplary user interface for the video game application.

DETAILED DESCRIPTION OF THE INVENTION

Figure 1:
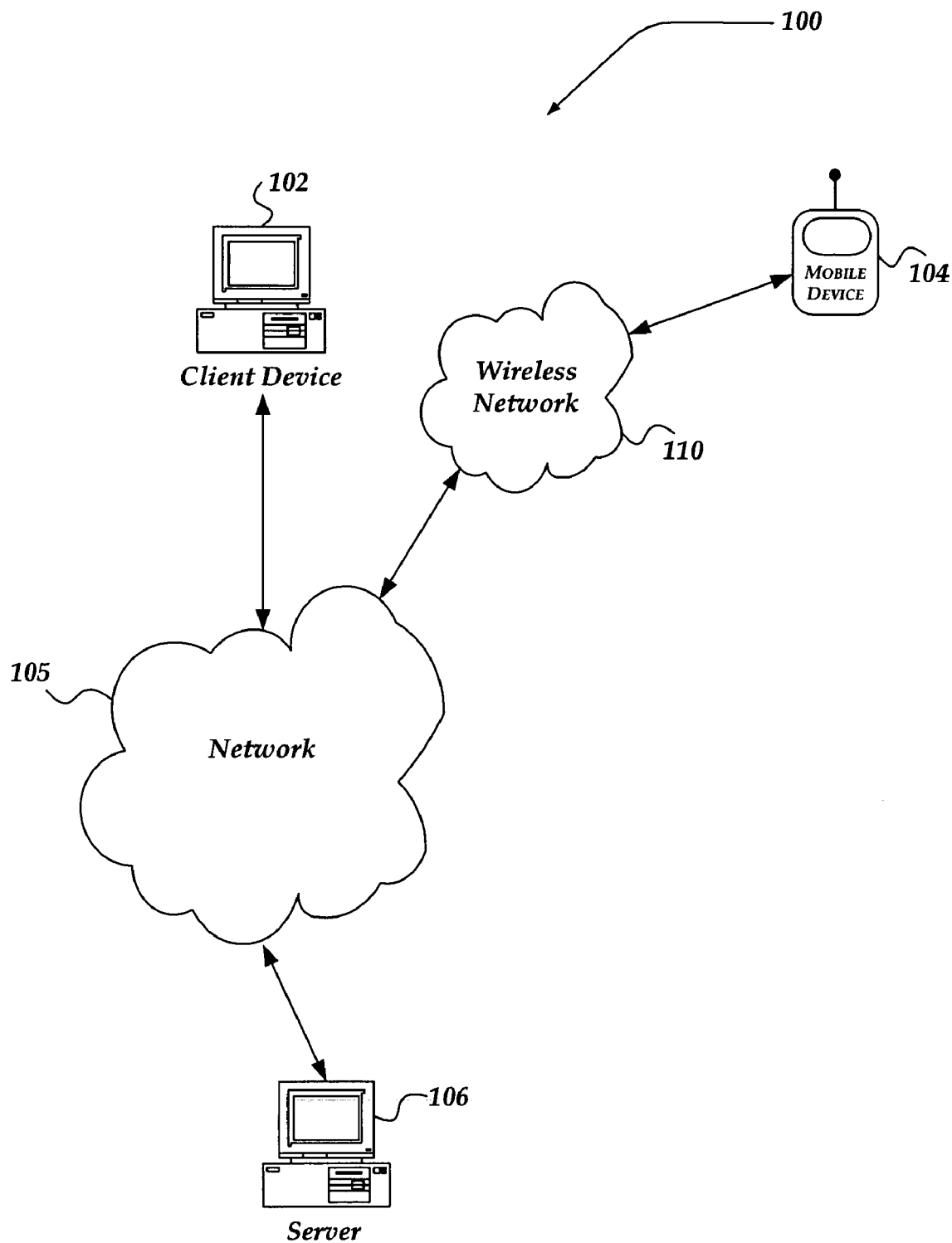
FIG. 1 shows a block diagram of a system for implementing an embodiment of the invention.

The present invention is directed to addressing the above-mentioned shortcomings, disadvantages and problems, and will be understood by reading and studying the following specification.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely software embodiment or an embodiment combining software and hardware aspects. The following detailed description is, therefore, not to be taken in a limiting sense.

Briefly stated, the invention is directed towards a method and system for a game that serves to educate a player about the decision making process for determining the cost of a premium for insurance coverage for an entity. The inventive game presents information to a player in such a way that a sensitivity can be developed regarding the variability and unpredictability of the costs associated with an insurance policy. In one embodiment, the insurance is provided for health care costs incurred over a period of time by several employees of the entity. However, in other embodiments, the insurance can cover entity property losses either separate from or in addition to employee health care costs. An entity includes, but is not limited to, a company, corporation, partnership, sole proprietorship, cooperative, non-profit organization, educational institution, government agency, limited liability corporation, professional corporation, limited liability partnership, and the like.

The invention can be played with single or multiple players, and the playing of the game enables a player to review various factors that are considered in selecting an insurance premium that is both profitable and attractive to customers. Prior to playing the game, the player(s) and/or team(s) select a fictitious name for an insurance company. In the fictitious name of the insurance company, a player/team can subsequently bid on providing insurance coverage for an entity. Several rounds of bidding on insurance premiums for providing insurance coverage to an entity can be played before determining a winner of the game. A round consists of a player(s) and/or team(s) bidding on the amount to charge for an insurance premium to insure the entity for a particular period of time, such as one year. The winner of a round is the insurance company (player/team) that provides the lowest bid for the insurance premium for the particular period of time.

The gain (or loss) from the lowest bid premium is calculated for the round winner as the premium less claims less operational expenses plus optional market share retention bonus for the particular period of time. This gain (or loss) is added (subtracted) to an initial reserve of assets associated with the fictitious insurance company. Typically, each fictitious insurance company starts with the same initial amount of reserve assets, e.g., $250,000. However, in other embodiments, the amount of the reserve assets can be unequally chosen and provided in different ways, such as random, predetermined and/or selected. Also, the optional market share retention bonus may be added to the reserve assets of the fictitious insurance company that wins a round to reflect the likelihood that a significant percentage of insured entities are likely to automatically renew their insurance coverage with the winner of a round. Typically, a winner of the game is identified after a predetermined period of time has elapsed and/or a predetermined number of rounds have been played. The winner of the game is the player/team that corresponds to the fictitious insurance company that has the most reserve assets after playing the final round.

Typically, the game is played by two or more teams of one or more players that initially provide a particular name (or select one of a plurality of provided names) for a fictional insurance company. Each fictional insurance company is subsequently associated with the team that provided/selected the particular name. However, in some embodiments, a single player and/or team can also play against a virtual player and/or team controlled by the video game application. In either case, once the names of the fictional insurance companies are provided/selected, several insurance factors are provided regarding statistical issues associated with the potential losses of an entity that is seeking insurance. Typically, these insurance factors are randomly generated and they are provided for consideration by each team. However, these factors are provided to each team for review prior to bidding on an insurance premium, the factors themselves are randomly selected, and the factors are employed in the generation of claims for an entity over a particular period of time. Additionally, the number of employees for an entity is usually predetermined, e.g., 100. However, in some embodiments, the number of employees can be significantly greater or less than 100, and can be selected or randomly chosen.

Health care insurance factors provided for consideration by each team can include, but are not limited to, participation, industry, age, gender, and percentage of members with families. The participation factor is based on the number of eligible members that actually subscribe to the insurance. Also, since some types of industries tend to have statistically more member insurance claims, this factor can be a significant consideration in determining the cost of premiums for the entity. Similarly, the age and gender of members can be a factor in determining the cost of the premium to pay for an insurance policy.

Once the insurance factors are randomly generated by the game for the entity and provided to the players/teams, they can place their bids for an insurance premium to provide insurance coverage for the entity. However, in other embodiments, these factors can be randomly generated after the bids for the insurance premiums have been offered.

Additionally, if a premium to provide property insurance coverage is to be bid on for the entity, property insurance factors can be provided for consideration by each player/team. These factors can include, but are not limited to, location, industry, age, portability, value, and the like.

Typically, the claims for the particular period of time to be covered by the premium are randomly generated from a datastore of potential claims that are based at least in part on their statistical probability of occurring. The listing of potential claims that are employed to generate the end of year claims can be arranged in a table, database, spreadsheet, list, document, and the like. Also, the likelihood of randomly selecting a potential claim in the datastore can be based on including, but not limited to, statistics, incidence, weighting, and the like.

The players/teams can play the game once to determine a winner or they can choose to repeat the video game several times for the same entity or another entity until a winner is subsequently declared. Additionally, an embodiment can enable a user to change the coverage of claims for which the insurance premium is bid. This type of adjustment can be shown in a user interface, e.g., a graph, histogram, and the like. Also, this adjustment can be illustrated with colors, graphics, pictures, sounds, and the like.

Typically, an insurance company includes large numbers of employees with diverse backgrounds and motivations, such actuaries, underwriters, salespersons, and the like. It is envisioned that insurance company employees with relatively diverse backgrounds could play this video game to facilitate their understanding of the complex business factors that are considered to find equilibrium between profit margin and enrollment gain. The team building and educational aspects of this game can also be useful in facilitating communication between employees regarding business factors that can lead to success in the insurance industry.

Illustrative Operating Environment

FIG. 1 illustrates one embodiment of an environment in which an embodiment the present invention may operate. However, not all of these components may be required to practice the invention, and variations in the arrangement and type of the components may be made without departing from the spirit or scope of the invention. As shown, system 100 of FIG. 1 includes network 105, wireless network 110, server 106, client device 102, and mobile device 104.

Generally, client device 102 may include virtually any computing device capable of receiving and sending a message over a network, such as network 105, wireless network 110, and the like, to and from another computing device, such as server 106, mobile device 104, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 102 also may be any computing device that is capable of connecting using a wired or wireless communication medium such as a PDA, POCKET PC, laptop computer, wearable computer, and any other device that is equipped to communicate over a wired and/or wireless communication medium.

Client device 102 may include a browser application that is configured to receive and to send web pages, web-based messages, and the like. The browser application may be configured to receive and display graphics, text, multimedia, and the like, employing virtually any web based language, including Standard Generalized Markup Language (SMGL), such as HyperText Markup Language (HTML), and so forth.

Client device 102 may further include a client application that enables it to perform a variety of other actions, including, communicating a message, such as through a Short Message Service (SMS), Multimedia Message Service (MMS), instant messaging (IM), internet relay chat (IRC), mIRC, Jabber, and the like, between itself and another computing device. The browser application, and/or another application, such as the client application, a plug-in application, and the like, may enable client device 102 to communicate content to another computing device.

Mobile device 104 represents one embodiment of a client device that is configured to be portable. Thus, mobile device 104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile device 104 typically ranges widely in terms of capabilities and features. For example, a cell phone may have a numeric keypad and a few lines of monochrome LCD display on which only text may be displayed. In another example, a web-enabled remote device may have a touch sensitive screen, a stylus, and several lines of color LCD display in which both text and graphics may be displayed. Moreover, the web-enabled remote device may include a browser application enabled to receive and to send wireless application protocol messages (WAP), and the like. In one embodiment, the browser application is enabled to employ a Handheld Device Markup Language (HDML), Wireless Markup Language (WML), WMLScript, JavaScript, and the like, to display and send a message.

Mobile device 104 also may include at least one client application that is configured to receive content from another computing device. The client application may include a capability to provide and receive textual content, graphical content, audio content, and the like. The client application may further provide information that identifies itself, including a type, capability, name, identifier, and the like. The information may also indicate a content format that mobile device 104 is enabled to employ. Such information may be provided in a message, or the like, sent to server 106, and the like.

Mobile device 104 may be configured to communicate a message, such as through a Short Message Service (SMS), Multimedia Message Service (MMS), instant messaging (IM), internet relay chat (IRC), mIRC, Jabber, and the like, between another computing device, such as server 106, and the like. However, the present invention is not limited to these message protocols, and virtually any other message protocol may be employed.

Client device 102 and/or mobile device 104 may be further configured to enable a user to participate in a game application for determining insurance company premiums, and the like, which may in turn be saved at a location, such as server 106, client device, mobile device, and the like. As such, client device 102 and/or mobile device 104 may further include a client application that is configured to manage various actions on behalf of the client device. For example, the client application may enable a user to interact with the browser application, email application, and the like, to manage their video game information. For example, the user may employ the client application, in part, to create a user profile, access and interact with the video game application.

Wireless network 110 is configured to couple mobile device 104 and its components with network 105. Wireless network 110 may include any of a variety of wireless sub-networks that may further overlay stand-alone ad-hoc networks, and the like, to provide an infrastructure-oriented connection for mobile device 104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 104 with various degrees of mobility. For example, wireless network 110 may enable a radio connection through a radio network access such as Global System for Mobile communication (GSM), Code Division Multiple Access (CDMA), General Packet Radio Services (GPRS), Enhanced Data GSM Environment (EDGE), Wideband Code Division Multiple Access (WCDMA), CDMA 2000, Universal Mobile Telecommunication System (UMTS), and the like. In essence, wireless network 110 may include virtually any wireless communication mechanism by which information may travel between mobile device 104 and another computing device, network, and the like.

Network 105 is configured to couple server 106 and its components with other computing devices, including, client device 102, server 106, and through wireless network 110 to mobile device 104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between server 106 and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

In one embodiment, server 106 provides support for a game application. Server 106 may include any computing device capable of connecting to network 105 to enable a user of at least one of client device 102 and mobile device 104 to play the game and communicate related information. Devices that may operate as server 106 include personal computers desktop computers, multiprocessor systems, microprocessor-based or programmable consumer electronics, mobile devices, network PCs, servers, and the like.

It is noted that while FIG. 1 illustrates a single computing device operable as server 106, the invention is not so limited. For example, the actions attributable to server 106 may be distributed across multiple computing devices, such as a group of servers, a network cluster, and the like, without departing from the scope or spirit of the invention.

Additionally, although not shown, a peer-to-peer arrangement of wired and/or wireless devices can also be arranged to perform substantially the same actions attributable to the client-server architecture disclosed for FIG. 1. Furthermore, although not shown, the functionality of the server and the client may be arranged in an application that operates on one or multiple computing devices.

Figure 2:
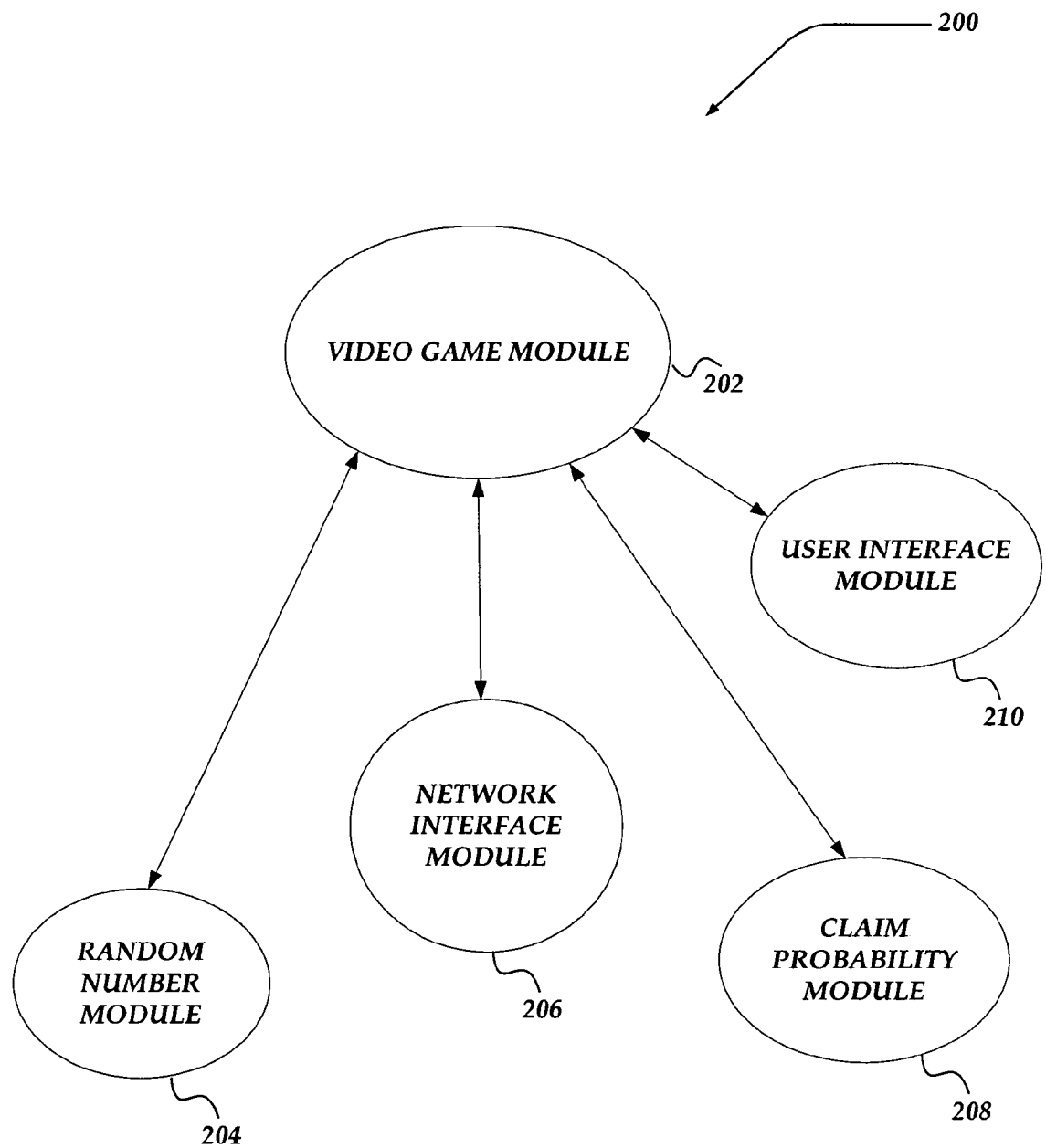
FIG. 2 illustrates a block diagram of an embodiment of modules for a video game application.

FIG. 2 illustrates a block diagram of overview 200 of program modules for implementing an embodiment of an exemplary game application. Game module 202 is in communication with a plurality of modules that implement various functions for the game, including, but not limited to, random number module 204, network interface module 206, claim probability module 208, user interface module 210, and the like. In one or more embodiments, game module 202 can be arranged in a client-server architecture, peer to peer architecture, and/or as a stand alone application. Also, network interface module 206 can be optionally employed to communicate over a network (wireless and/or wired) with other video game modules and components.

In one embodiment, claim probability module 206 can include a table of potential claims where the incidence (number of times a potential claim is repeated in the table) is correlated to the probability that such a potential claim might occur over a period of time, such as one year. For example, if a table included 10,000 entries and the incidence of a particular type of potential claim was 1%, then there would be 100 entries in the table for that type of claim (100/10,000=1%). Additionally, random number module 204 can include a random number generator that is employed to randomly indicate rows in the claim probability table that are correlated to the potential claims in the table. These randomly indicated potential claims are subsequently employed as the end of year claims associated with a potential customer of the teams/players of the game.

Illustrative Flow Charts

Figure 3:
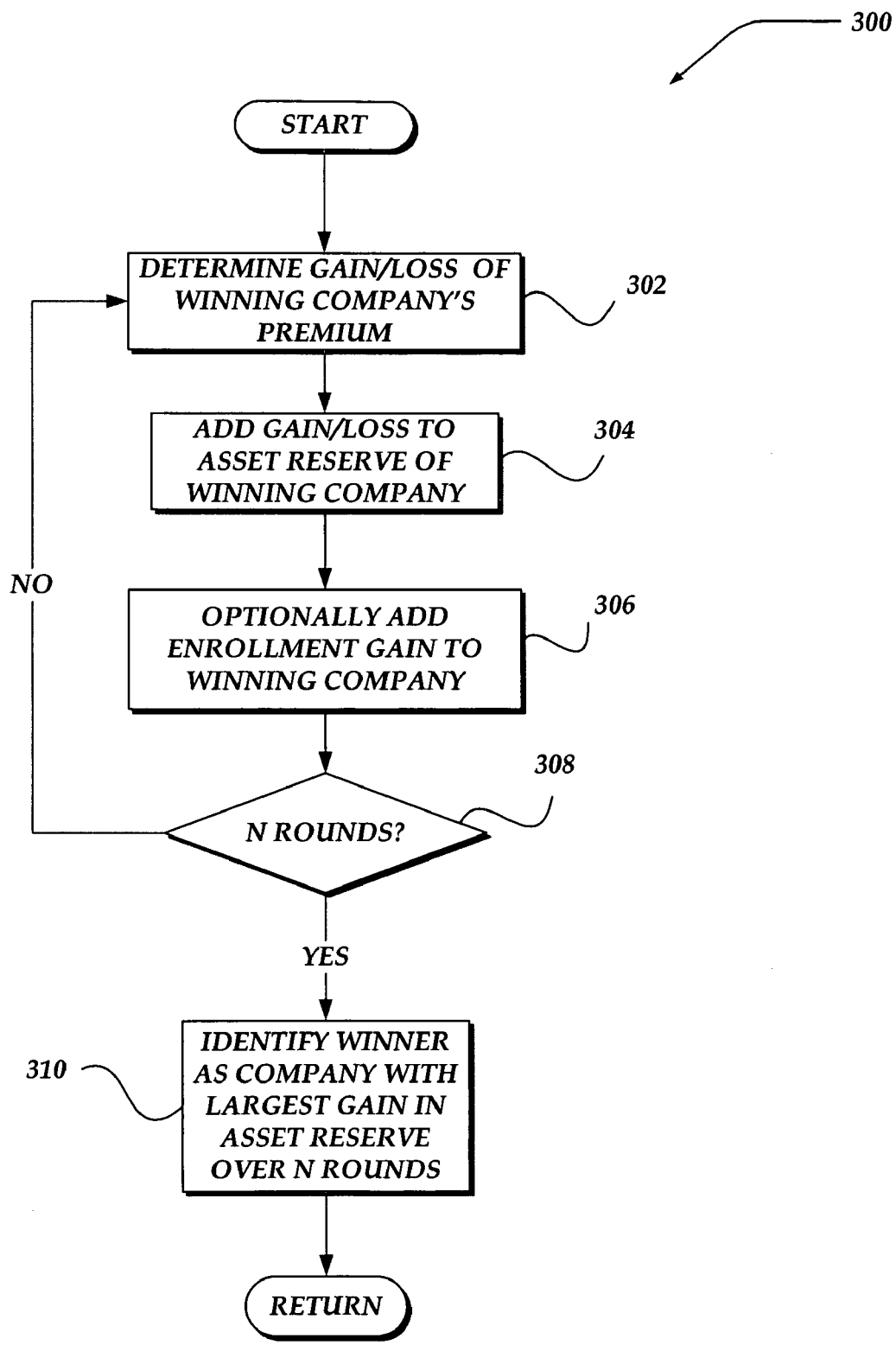
FIG. 3 shows a flow chart of a process for implementing an embodiment of the video game application.

FIG. 3 illustrates an overview 300 of actions associated with "winning" the game. Moving from a start block, the process advances to block 302 where the gain or loss of the premium provided by the winner (lowest bidding company) of a round is determined. Typically, the gain or loss includes the amount of the premium less the claims for the determined period of time less operational expenses, as discussed elsewhere in the specification. At block 304, the profit or loss of the lowest bid premium for the round (after covering claims and operational expenses) is added to an asset reserve for the winning company Flowing to block 306, an additional gain is optionally added to the winning insurance company's asset reserve to reflect the likelihood that members of the insured entity may automatically renew their insurance with the winner. Next, the process advances to decision block 308, where a determination is made as to whether or not the game has been played for "N" rounds, e.g., each round could represent one or more virtual years that the teams/players have chosen to play. If the determination at decision block 308 is false, the process loops back to block 302 where substantially the same actions discussed above are repeated.

However, if the determination at decision block 308 is true, the process advances to block 310 where the winning virtual insurance company is determined by identifying the company with the largest gain in their asset reserve over the N rounds. Next, the process returns to processing further actions.

Figure 4:
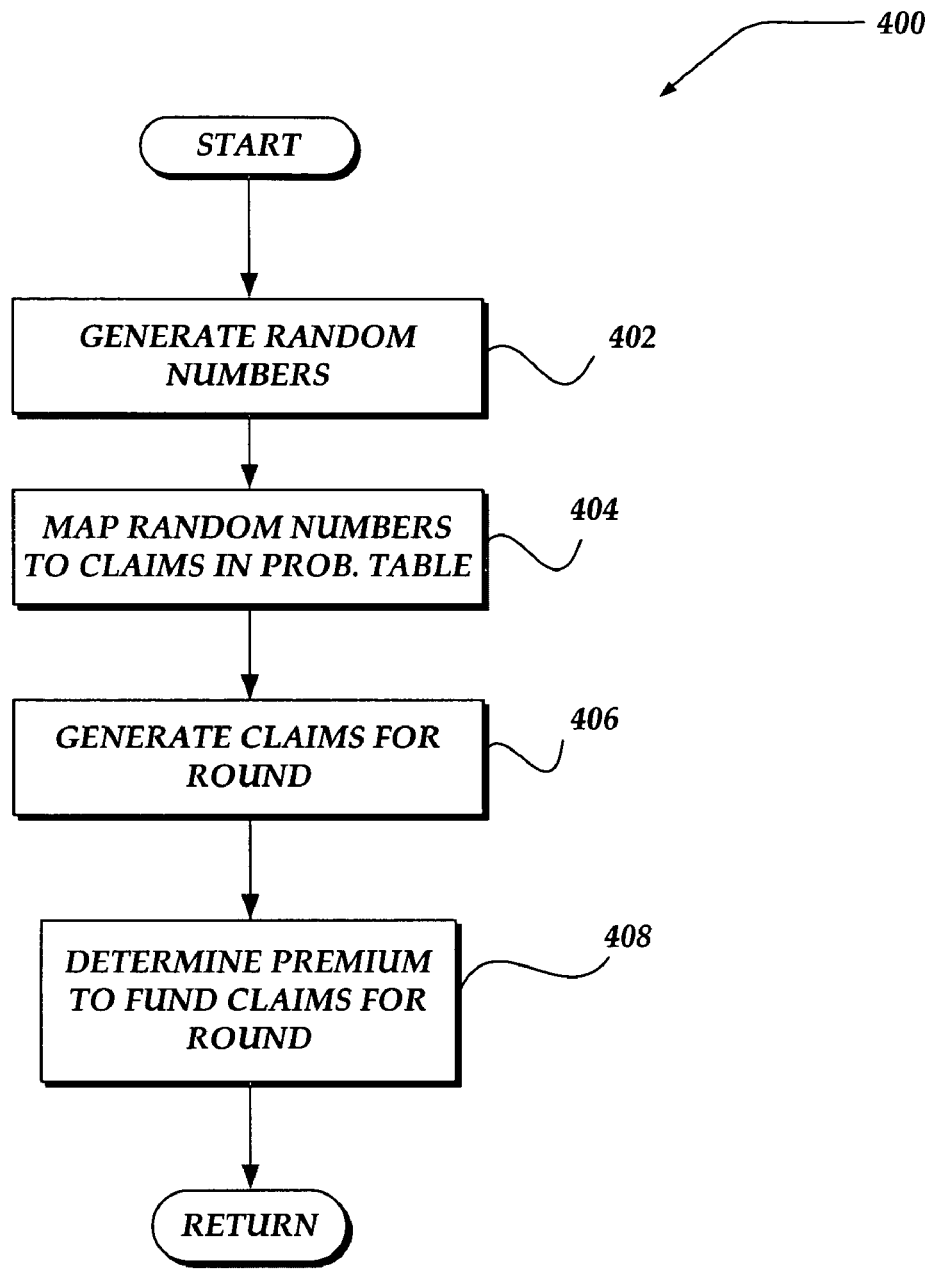
FIG. 4 shows a flow chart of a process for randomly generating end of year claims for the video game application.

FIG. 4 shows a flow chart of process 400 for randomly determining the claims associated with an entity for a round of the game. Moving from a start block, the process advances to block 402 where random numbers are generated. At block 404, each randomly generated number is mapped to a separate claim included in a datastore, such as a table, list, and the like. In one embodiment, the incidence of each type of claim in the datastore is at least partially based on the probability of occurrence of the claim over a predetermined period of time, such as one or more years. In another embodiment, a weight can be employed either singly, or in combination with another factor, such as random selection, to map the separate claims to each randomly generated number.

Advancing to block 406, the claims for the round are generated based on the mapping of the randomly generated numbers to claims in the datastore. Flowing to block 408, the process determines the amount of that a premium could cover the cost of the generated claims for the round. Next, the process advances to performing other actions.

Figure 5:
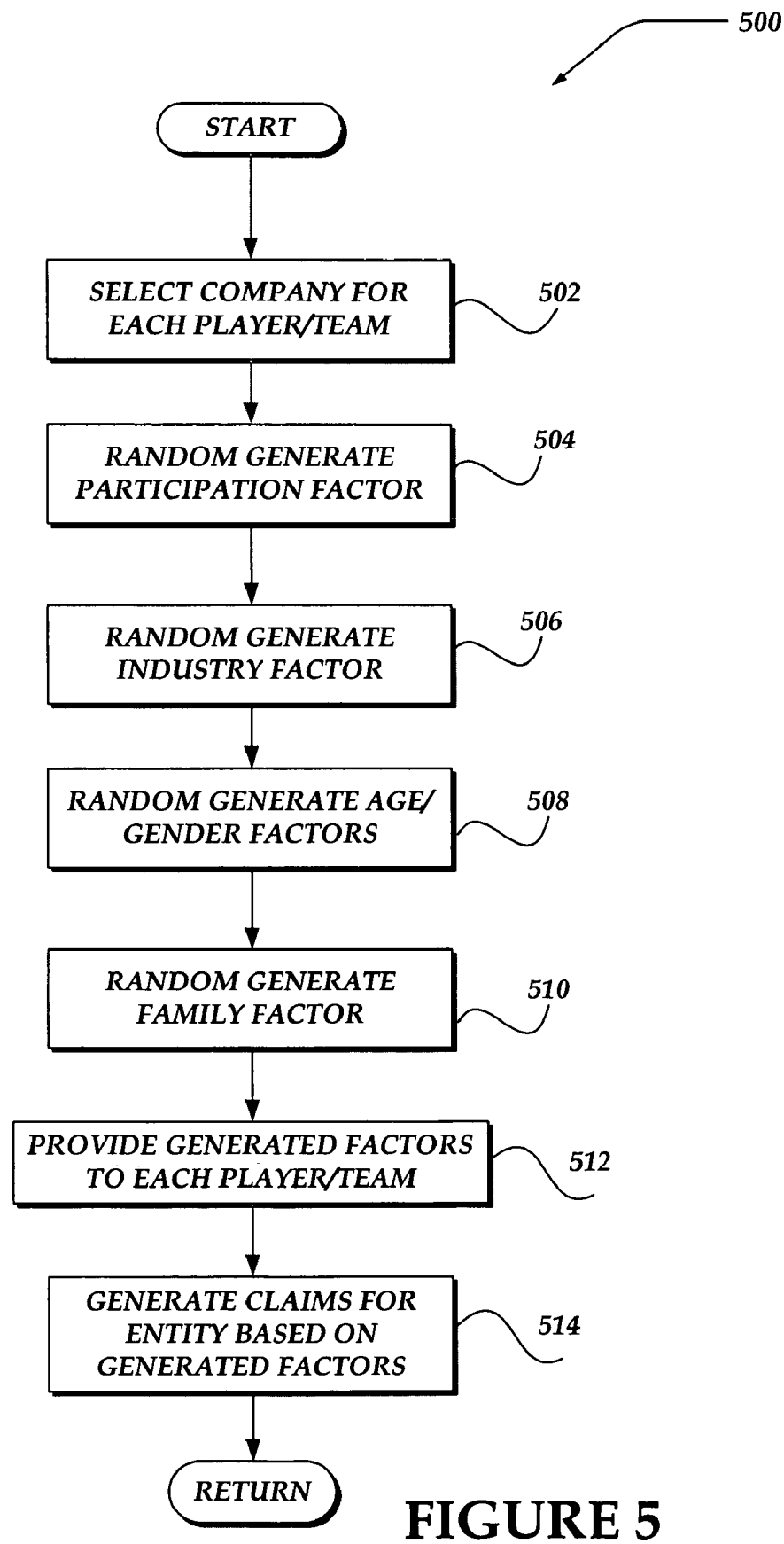
FIG. 5 illustrates a flow chart of a process for generating parameters for each company name to be played in the video game application.

FIG. 5 illustrates a flow chart of process 500 for generating factors that can be employed to generate (more or less) claims for the entity in a round. Also, the generated factors can be employed by the players/teams to determine the amount of a premium that is bid in a round. In different embodiments, these factors can be represented as ratios, percentages, constants, weights, and the like. Moving from a start block, the process advances to block 502 where an insurance company is selected by each team/player. Also, the teams/players can optionally provide and/or select a name for their respective insurance company. At block 504, the participation factor is randomly generated for the potential members of the entity to be insured. Typically, the participation factor is less than or equal to 100% of the entity's employees.

The process steps to block 506 where another factor is generated for the industry that the entity is associated with. For example, if the entity is associated with a dangerous industry, e.g., deep sea diving, the industry factor could be substantially greater than 100% (more likely to have significant and frequent claims). However, if the entity is associated with a relatively safe industry, such as accounting, the industry factor could be substantially less than 100%.

Flowing to block 508, gender and age factors are generated, which are based at least in part on historical and previously collected information from relatively large populations. The gender and age factors typically reflect statistical probabilities regarding potential claims over a given year for a particular gender at a particular age.

Advancing to block 510, the process randomly generates a family factor which is representative of the number of entity employee's with families. The process moves to block 512 where the generated factors are provided to each team/player. In one embodiment, the generated factors are provided prior to the teams/players bidding on a premium for a round, and in other embodiments the factors are provided after the bidding is done.

Moving to block 514, claims for the round are generated based at least in part on the generated factors for the entity. Next, the process returns to performing other actions.

Figure 6:
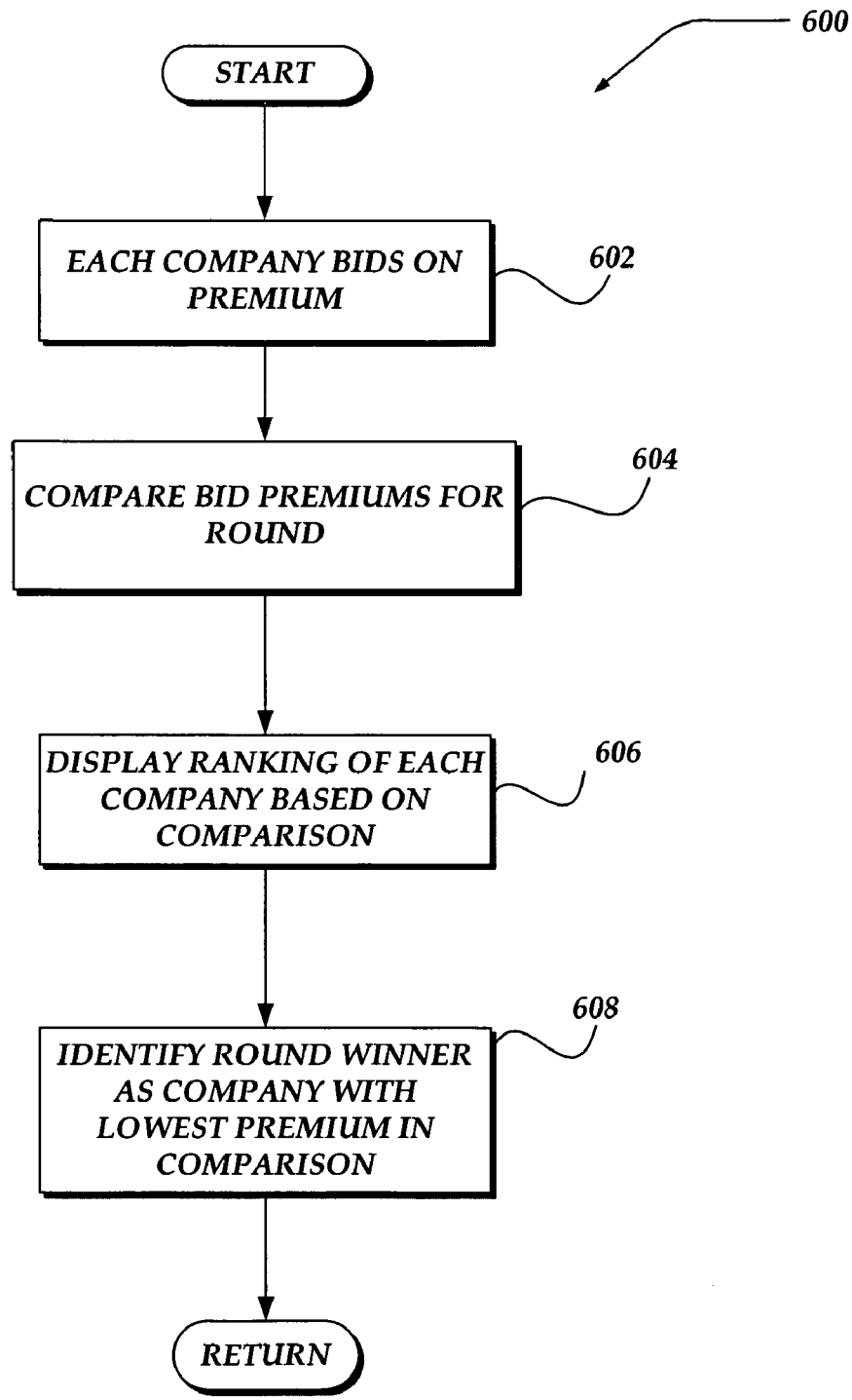
FIG. 6 illustrates a flow chart of a process for determining the winner of a session of the video game application.

FIG. 6 illustrates a flow chart of process 600 for determining a winner for playing a round of the game. Moving from a start block, the process flows to block 602 where the teams/players select/provide a bid for a premium to provide insurance coverage to the entity for a round. At block 604, the bids for the premiums are compared to each other.

Advancing to block 606, the ranking of each company is displayed based on the amount of their bid for the premium. Moving to block 608, the winning company for the round and its lowest bid for the premium is identified. Although not shown, the gain or loss generated by the lowest bid premium is added to the winner's asset reserve. Next, the process returns to performing other actions.

Illustrative Interfaces

FIG. 7 illustrates an exemplary main user interface for the video game application. As shown, the main user interface provides a listing of each company and its respective name that is selected/provided by a team/player. The user interface provides additional information, including: an initial reserve (initial capitalization) for each company; change in reserve for each company; enrollment gain for each company; and an accumulated total reserve for each company. Also, the main user interface provides navigation and other controls such as "start over", "go", "next bid", "instructions", and "team names".

Figure 8:
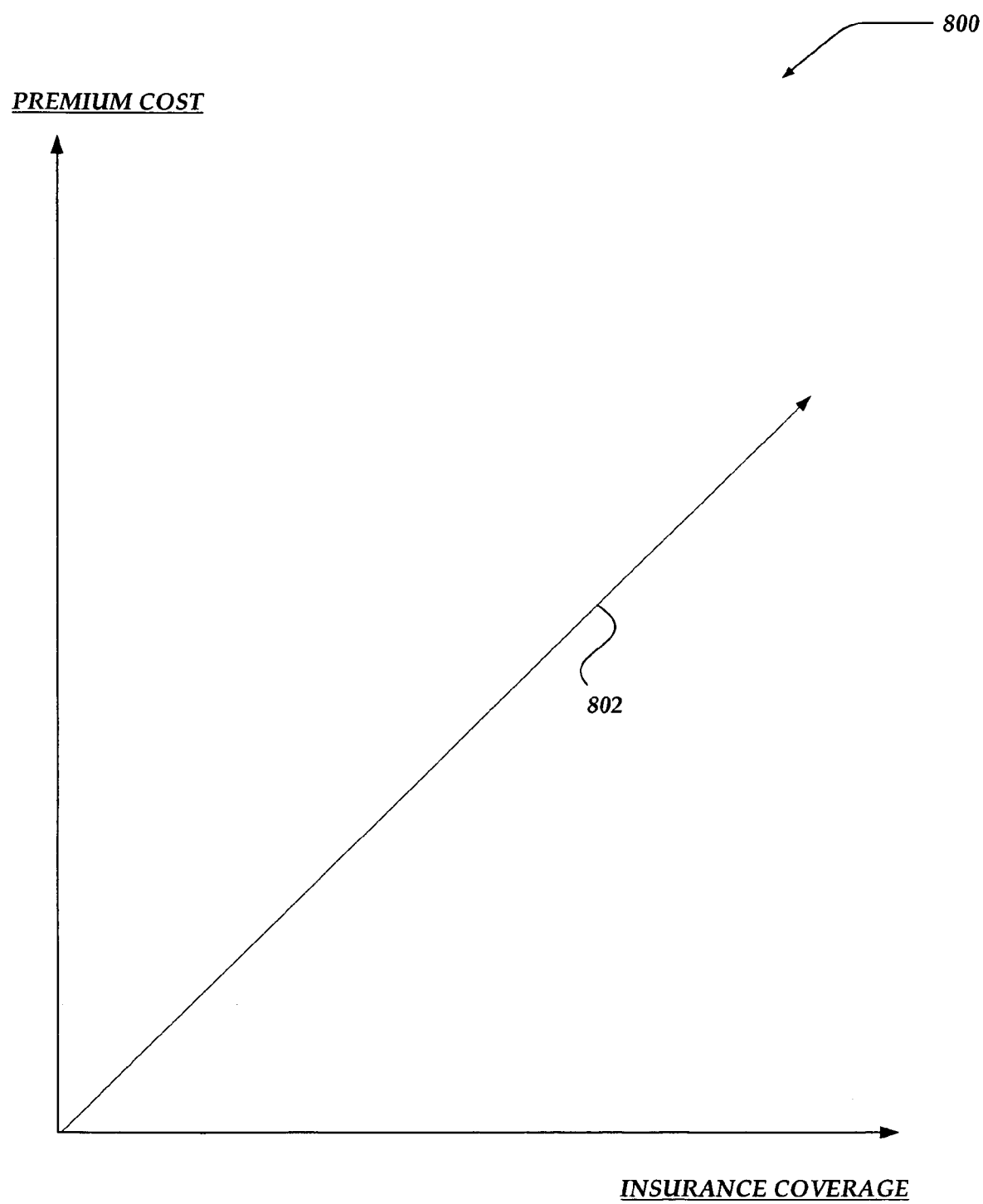
FIG. 8 illustrates a graph of insurance premium cost versus insurance coverage, in accordance with the invention.

FIG. 8 illustrates overview 800 of a graph for the cost of a premium for insurance versus the amount of coverage provided by the insurance. Graph line 802 illustrates the correspondence between an increase in the value of a premium and the amount of insurance coverage that can be provided to an entity. Although not shown, embodiments of the game can include one or more controls that enable a player to simulate the effect of changes in the amount of insurance coverage or premium that is bid in a round.

Although the present invention has been described in the context of a game application, the invention is not so limited. For example, the invention may be applicable to virtually any interactive software that employs logic and may provide differing results. Furthermore, an application for implementing the game can be provided in different ways, including, client-server, peer-to-peer, stand-alone, applet, and the like.

It will be understood that each block of the flowchart illustrations, and combinations of blocks in the flowcharts, may be implemented by a combination of hardware-based systems and software instructions. The software instructions may be executed by a processor to cause a series of operational steps to be performed by the processor to produce a computer-implemented process such that the instructions, which execute on the processor, provide steps for implementing some or all of the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The various embodiments have been described above in light of certain mathematical relationships. A person skilled in the art would note that these mathematical relationships are subject to many possible computer implementations, which are all within the scope of the invention. Furthermore, it should be noted that the language of mathematics allows many ways to convey the same relationship. All such variations of the above described equations and relationships are naturally within the scope of the invention.

The above specification, examples, and data provide illustrative embodiments of the present invention. Since many embodiments of the invention can be made without departing from the spirit and scope of the invention, the invention resides in the claims hereinafter appended.

What is claimed as new and desired to be protected by Letters Patent of the United States is:

1. A method for teaching how insurance is provided for an entity with a processor that enables actions, comprising:
   providing at least one factor associated with the entity, wherein the factor is associated with a potential likelihood of a claim by the entity for insurance reimbursement over a period of time;
   bidding on a premium to provide insurance for the entity over the period of time, wherein the bid is based at least in part on the at least one factor associated with the entity;
   generating at least one claim for the entity over the period of time; and
   identifying, via said processor, a user that bid for the premium at a lowest cost over the period of time, and identifying via said processor, a winner as at least one user with a largest positive reserve of funds after deducting the generated at least one claim from the premium that was lowest bid by the winner.

2. The method of claim 1, further comprising repeating the actions of the method until at least one of a predetermined period of time is over or the actions of the method have been repeated for a selected number of times.

3. The method of claim 2, wherein repeating the actions further comprises providing a reserve of the user that bid for the premium at the lowest cost with additional funds, wherein the additional funds are representative in part of a potential for renewal of the insurance by the entity with that user.

4. The method of claim 1, further comprising identifying the winner with the largest positive reserve of funds after deducting at least a cost of providing insurance and the at least one generated claim.

5. The method of claim 1, wherein the entity is at least one of a company, corporation, partnership, sole proprietorship, cooperative, non-profit organization, educational institution, government agency, limited liability corporation, limited liability partnership, or professional corporation.

6. The method of claim 1, wherein the factor includes at least one of participation, industry, age, gender, or family.

7. The method of claim 1, further comprising a plurality of potential claims that are included in a datastore, wherein the plurality of potential claims are arranged in the datastore based on at least one of probability, incidence or weighting.

8. The method of claim 1, further comprising enabling at least one user to change a coverage of the insurance for claims generated for the entity.

9. The method of claim 1, further comprising enabling at least one user to change the generated claims for the entity.

10. The method of claim 1, further comprising enabling at least one user to select an association with a company, and enabling at least one user to select a name for the company.

11. A computer readable medium storing a game and executed by a processor for teaching how insurance is provided for an entity, comprising:
   a module for providing at least one factor associated with the entity, wherein the factor is associated with a potential likelihood of a claim by the entity for insurance reimbursement over a period of time;

a module for bidding on a premium to provide insurance for the entity over the period of time, wherein the bid is based at least in part on the at least one factor associated with the entity;

a module for generating at least one claim for the entity over the period of time; and a module for identifying a user that bid for the premium at a lowest cost over the period of time, and identifying a winner as at least one user with a largest positive reserve of funds after deducting the generated at least one claim from the premium that was lowest bid by the winner.

12. The game of claim 11, further comprising a module for enabling a plurality of users to bid over a network on the premium for providing insurance for the entity.

13. The game of claim 11, further comprising a module for repeating the actions of the method until at least one of a predetermined period of time is over or the actions of the game have been repeated for a selected number of times.

14. The game of claim 13, wherein repeating the actions further comprises providing a reserve of the user that bid for the premium at the lowest cost with additional funds, wherein the additional funds are representative in part of a potential for renewal of the insurance by the entity with that user.

15. The game of claim 11, further comprising a module for identifying the winner with the largest positive reserve of funds after deducting at least a cost of providing insurance and the at least one generated claim.

16. The game of claim 11, wherein the actions are performed in at least one of a client-server architecture, peer architecture, or a stand alone application.

17. A processor readable medium that includes code that when executed by a processor enables actions for teaching how insurance is provided for an entity, comprising:

a module for providing at least one factor associated with the entity, wherein the factor is associated with a potential likelihood of a claim by the entity for insurance reimbursement over a period of time;

a module for bidding on a premium to provide insurance for the entity over the period of time, wherein the bid is based at least in part on the at least one factor associated with the entity;

a module for generating at least one claim for the entity over the period of time; and a module for identifying a user that bid for the premium at a lowest cost over the period of time, and identifying a winner as at least one user with a largest positive reserve of funds after deducting the generated at least one claim from the premium that was lowest bid by the winner.

18. The processor readable medium of claim 17, further comprising a module for enabling a plurality of users to bid over a network on the premium for providing insurance for the entity.

19. The processor readable medium of claim 17, further comprising a module for repeating the actions until at least one of a predetermined period of time is over or the actions of the game have been repeated for a selected number of times.

20. An apparatus for enabling actions to determine a premium for insurance, comprising:

a memory for storing code that enables actions;

a processor for performing actions, including:

provisioning at least one factor associated with the entity, wherein the factor is associated with a potential likelihood of a claim by the entity for insurance reimbursement over a period of time;

bidding on a premium to provide insurance for the entity over the period of time, wherein the bid is based at least in part on the at least one factor associated with the entity;

generating at least one claim for the entity over the period of time; and identifying a user that bid for the premium at a lowest cost over the period of time, and identifying a winner as at least one user with a largest positive reserve of funds after deducting the generated at least one claim from the premium that was lowest bid by the winner.

* * * * *